E. GOSS.
MACHINES FOR TENONING SPOKES AND BORING FELLIES.
No. 194,300. Patented Aug. 21, 1877.
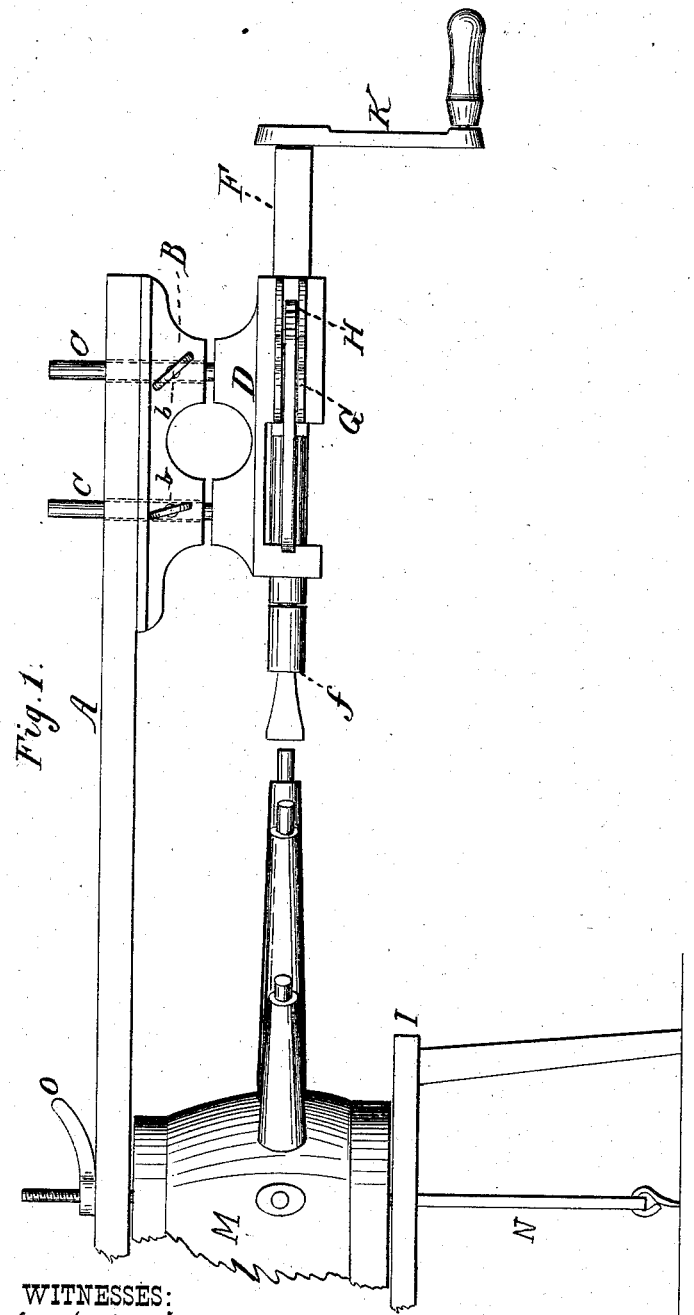
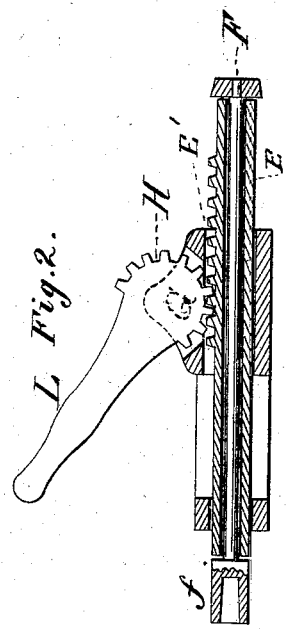

UNITED STATES PATENT OFFICE.

EUGENE GOSS, OF KINGSTON, WISCONSIN.

IMPROVEMENT IN MACHINES FOR TENONING SPOKES AND BORING FELLIES.

Specification forming part of Letters Patent No. 194,300, dated August 21, 1877; application filed April 23, 1877.

*To all whom it may concern:*

Be it known that I, EUGENE GOSS, of Kingston, in the county of Green Lake and State of Wisconsin, have invented certain new and useful Improvements in Machines for Tenoning Spokes and Boring Fellies; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

The object of my invention is to furnish a simple spoke-tenoning and felly-boring machine.

Its chief merit is its simplicity.

Figure 1 is a side view of my invention. Fig. 2 is a horizontal sectional view.

A is a bar, one end of which is attached to the rod N. The rod N is fastened by a staple to the floor, and pierces the horse I through the center. On the rod N, as an axis, is placed the hub M. The rod N is provided with screw-threads on its upper end, and it receives the bar A through a slot made for that purpose. The hand-nut O keeps the bar A in a horizontal position. The other end of the bar A is provided with the bracket B to receive the set-screws $b\ b$. The bracket B may be made of metal or wood, and is rigidly attached to the bar A. The bolts C C are firmly attached to the bracket D, and operate vertically through the bracket B, and are regulated by the set-screws $b\ b$. The bracket D is provided with depending bearings for the sleeve E. The auger-shaft F is moved in the sleeve E by the crank K. The socket $f$ in the auger-shaft F is made to receive the auger for tenoning spokes or boring fellies. The lever L is provided with the segmental gear H, and is pivoted to the jaw G. The sleeve E is provided with the rack E'.

The operation of my invention is evident. When the hub with its projecting spokes is placed in position, as shown in the drawings, the left hand grasps the lever L, while with the right hand the crank K is turned. The auger-shaft is moved forward or backward by the lever L.

Having now fully described my invention, what I claim, and desire to secure by Letters Patent, is—

1. In a spoke-tenoning and felly-boring machine, the bar A, connected with the rod N at one end, and provided at the other end with the bracket B, in combination with the bolts C C, the bracket D, and the auger-shaft F, substantially as described, and for the purposes set forth.

2. The rod N, horse I, and nut O, in combination with the bar A, bracket B, bolts C C, bracket D, and auger-shaft F, substantially as described, and for the purposes set forth.

In testimony that I claim the foregoing I have hereunto set my hand this 5th day of March, 1877.

EUGENE GOSS.

Witnesses:
HENRY PETTIT,
W. K. SMITH.